March 7, 1939.                    G. M. PELTZ                    2,149,542
                              TEMPERATURE CONTROL
                           Original Filed Oct. 13, 1933
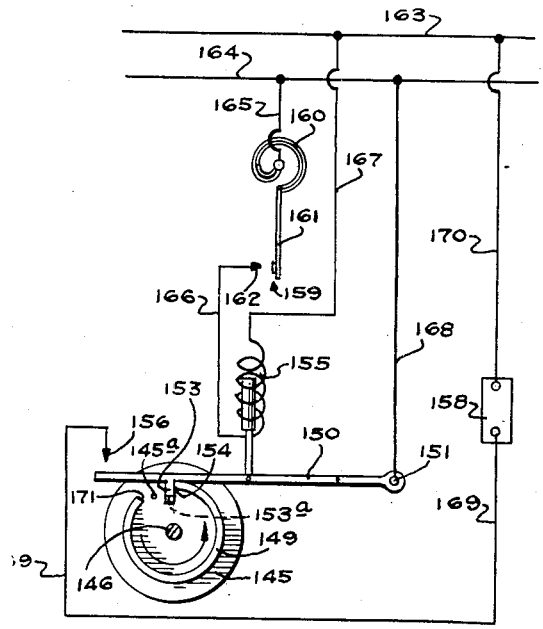
INVENTOR
Gordon M. Peltz
BY HIS ATTORNEY
George H Fisher Patented Mar. 7, 1939

2,149,542

UNITED STATES PATENT OFFICE 2,149,542

TEMPERATURE CONTROL

Gordon M. Peltz, Lancaster, Pa., assignor to Minneapolis-Honeywell Regulator Company, Minneapolis, Minn., a corporation of Delaware Original application October 13, 1933, Serial No. 693,457. Divided and this application April 1, 1936, Serial No. 72,105

10 Claims. (Cl. 236—74)

This specification comprises a division of my co-pending application Serial No. 693,457, filed October 13, 1933, for Temperature control.

The invention relates to control mechanism, and more particularly to that type wherein temperature is controlled and maintained at a predetermined level by the actuation and de-actuation of suitable heat producing mechanism.

One object of this invention is the provision of improved means to maintain the temperature in a space to be heated substantially at a desired value at all times.

Another object of this invention is the provision of improved means to preclude high frequency operation of a thermally responsive means such as a conventional bimetallic thermostat which, in the absence of the device of the instant invention, might be occasioned by a relatively slight fluctuation in temperature from the predetermined value.

A further object is the provision of an improved time controlled mechanism so arranged and constructed that upon a change in temperature, serving to actuate a thermostat to close or open a circuit, an appreciable time period must elapse before the circuit may be reopened or reclosed by a temperature change in the opposite direction.

Still another object is the provision of condition responsive means and timing means adapted to control a condition changing mechanism, so arranged that the condition responsive means is operable at all times to actuate or deactuate the condition changing mechanism except for a predetermined, appreciable minimum period immediately subsequent to such actuation or deactuation, during which the timing means controls operation, after which control is immediately returned to the condition responsive means.

A more specific object is the provision of a single circuit thermostat adapted to control the operation of a suitable heat producing means such, for example, as a stoker motor, a timing mechanism so arranged that upon actuation of the stoker motor by the thermostat deactuation is precluded for a period of time not less than one minute, and means to return control to the thermostat to operate the stoker motor in accordance with temperature condition immediately subsequent to termination of such time period.

Other objects will in part be obvious and in part pointed out hereafter.

Accordingly, the invention consists in the combination of elements, arrangements of parts, and features of construction, all as will be hereinafter pointed out and shown in the accompanying drawing and the scope of the application of which will be indicated in the appended claims.

Referring now to the drawing wherein is shown one of the various possible embodiments of this invention:

Figure 1 is a schematic wiring diagram showing the system of one embodiment of the instant invention, Figure 2 is a side elevation of a timing mechanism utilized in connection with the system of Figure 1, certain parts being shown in section, Figure 3 is a sectional view of the timing mechanism of Figure 2 taken substantially along the line 3—3 of Figure 2.

Similar reference characters designate similar parts throughout the several views of the drawing.

Referring particularly to Figures 2 and 3, a suitable timing mechanism, which comprises a base 140 supporting an electric motor 141 by means of a suitable bracket 142, is disclosed. Motor 141 drives a friction disc 143 by means of a suitable gear reduction (not shown) housed in a casing 144, preferably at a speed of not more than approximately one revolution per half-minute and not less than one revolution in less than the amount of time required to change the temperature in a space to be heated about two degrees F. Friction disc 143 is abutted by timing disc 145 which is mounted on a shaft 146 journaled in a bracket 147, and an end plate 152 which in turn are mounted upon base 140. A coil spring 148 is interposed between bracket 147 and timing disc 145 constantly to bias the latter into engagement with friction disc 143. An arcuate track 149 is mounted upon timing disc 145 concentrically with the axis thereof. Track 149 does not form a complete circle. A lever 150 is pivoted on a pin 151 carried by end plate 152 and provided with a depending extension 153 which, with the parts in the position shown in the drawing, lies in the path of, and is abutted by, an end 154 of track 149. The engagement of end 154 with projection 153 prevents rotation of timing disc 145, but motor 141, which is continuously energized, is allowed to continue to rotate by reason of slippage between friction disc 143 and timing disc 145. Extension 153 is provided with a gateway 153a. An electro-magnetic coil 155, when energized in a manner to be hereinafter described, is adapted to lift lever 150 in such manner that gateway 153 is brought into registry with track 149, which permits disc 145 to rotate in a counter-clockwise direction as viewed in Figures 1 and 3, indicated by arrows. The raising of lever 150 brings an end thereof into engagement with a contact 156 carried by a flexible blade 157 preferably secured to end plate 152. Disc 145 is provided with a pin 145a which will pass through gateway 153a when coil 155 is deenergized, and consequently extension 153 is in its lowermost position, but which engages the lower end of extension 153 when lever 150 is raised by energization of electro-magnetic coil 155.

Referring particularly to Figure 1, there is indicated at 158 any suitable electrically controlled temperature changing device which may take the form of a conventional stoker motor adapted to feed fuel to a fire. The system disclosed includes a conventional room thermostat 159 comprising a bimetallic actuator 160 which controls a contact blade 161, the arrangement being such that contact blade 161 is adapted upon a fall in temperature in the space adjacent thermostat 159, to engage a contact 162. Line wires 163 and 164 supply power to the system from a suitable source (not shown).

With the parts in the position shown in Figure 1, extension 153 is in the path of, and abutted by, end 154 of track 149 to preclude movement of timing disc 145, the temperature of the space to be heated is at or above the desired value, and contact blade 161 of thermostat 159 is consequently out of engagement with contact 162, lever 150 is out of engagement with contact 156, and stoker motor 158 is consequently deenergized. Accordingly, the temperature adjacent thermostat 159 will normally drop, and when a predetermined minimum temperature is reached blade 161 will engage contact 162 and energize electro-magnetic coil 155 through a circuit comprising line wire 164, wire 165, bimetallic element 160, contact blade 161, contact 162, wire 166, electro-magnetic coil 155, wire 167 and line wire 163. Coil 155 is thus energized and raises lever 150 into engagement with contact 156 and gateway 153a into registry with track 149, whereupon track 149 passes through gateway 153a upon rotation of timing disc 145 by motor 141 through the frictional engagement of discs 143 and 145. The engagement of lever 150 with contact 156 energizes stoker motor 158 through a circuit comprised of line wire 164, wire 168, lever 150, contact 156, wire 169, stoker motor 158, wire 170 and line wire 163. The upper surface of gateway 153a rides upon the upper surface of track 149 to maintain lever 150 in raised position so that even though the temperature rises to such a point that contact blade 161 leaves contact 162, lever 150 will be maintained in engagement with contact 156 to maintain energization of stoker motor 158.

If thermostat 159 still calls for heat when disc 145 has substantially completed one revolution so that coil 155 is energized, the lower end of extension 153 is engaged by pin 145a to prevent further rotation of disc 145 which will thereafter remain stationary until thermostat 159 is satisfied and deenergizes electro-magnetic coil 155 to release lever 150. Upon such release lever 150 moves to its lower position and gateway 153a moves into registry with pin 145a whereupon disc 145 returns to its initial position as shown in Figure 3, wherein extension 153 is abutted by end 154 of track 149 to hold disc 145 against rotation.

If, on the other hand, electro-magnetic coil 155 is deenergized when disc 145 has substantially completed a revolution, lever 150 will immediately drop, bringing gateway 153a into registry with pin 145a and the parts will return to their original position.

In the system as shown, therefore, immediately upon a call for heat resulting in engagement of contact blade 161 with contact 162 a circuit to stoker motor 158 is completed and will thereafter be maintained completed until timing disc 145 has made substantially one complete revolution or cycle. Timing disc 145 is assured of making substantially one complete revolution even though blade 161 separates from contact 162 immediately upon energization of stoker motor 158. Therefore, a minimum firing period is insured and there will always be a variable delay between the opening of room thermostat 159 and deenergization of stoker motor 158, such delay depending entirely upon the position of an end 171 of track 149 with respect to projection 153 at the time thermostat 159 opens the circuit to electro-magnetic coil 155. After the minimum firing period the control is returned, through the abutment of pin 145a with extension 153, to thermostat 159.

The system disclosed, therefore, demonstrates a manner in which a single circuit bimetallic open thermostatic switch may be utilized to preclude high frequency operation without sacrificing any of the sensitivity of the apparatus.

While in the foregoing illustrative embodiment of the invention a temperature responsive mechanism is shown and described as actuating a heat producing mechanism, it will be readily understood that the invention is equally applicable to pressure or other condition responsive devices. It will further be understood that while there is herein described a timer mechanism adapted to actuate a heat producing mechanism immediately upon a call for heat by a thermostat and retard deactuation thereof, that a converse operation so arranged as to retard actuation of a heat producing mechanism and permit immediate deactuation thereof is equally within the scope of the invention.

From the foregoing it will be seen that there is herein provided a device which embodies the features of this invention and achieves the objects thereof, including advantages of great practical importance.

As many possible embodiments may be made of the above invention and as many changes might be made in the embodiment above set forth, it is to be understood that all matter hereinbefore set forth or shown in the drawing is to be interpreted as illustrative and not in a limiting sense.

I claim as my invention:

1. In combination, a single circuit main control switch responsive to a condition which it is desired to control, means for controlling said condition, timing means and connections between said main control switch, condition controlling means and timing means for operating said condition controlling means for at least a predetermined minimum period upon closure of said main control switch and means for placing said condition controlling means solely under the control of said main control switch at the end of said period until a predetermined condition has been reached, causing the opening of said switch, if the switch is still closed at the end of said period.

2. In combination, a single circuit main control switch, a device to be controlled, means associated with said main control switch for placing said device in operation, timing means and means associated with said timing means and control device for maintaining said device in operation for at least one minute independently of the main control switch after operation of said device has once been energized by said main control switch, and means for placing said condition controlling means solely under the control of said main control switch at the end of said time until a predetermined condition has been reached, causing the opening of said switch, if the switch is still closed at the end of said time.

3. In combination, a constantly rotating motor means, a friction disc coupled thereto, a timing disc frictionally driven by said friction disc, latch means, means associated with said timing disc and latch means for providing substantially one complete revolution of said timing disc upon momentary release of said latch means, a switch, means for at least momentarily releasing said latch means, means for closing said switch and maintaining the same closed during rotation of said timing disc, and a device controlled by said switch.

4. In combination, a constantly rotating motor means, a friction disc coupled thereto, a timing disc frictionally driven by said friction disc, an arcuate track carried by said timing disc, said track being less than a complete circle, a stop normally in the path of movement of said track whereby said track abuts said stop and said timing disc and track are prevented from rotating, a temperature responsive actuator, means controlled thereby and associated with said stop for moving the same from the path of said track when the temperature to which said actuator responds is at a predetermined value, whereby said track and timing disc are released for rotation, said track thereafter maintaining said switch stop in its releasing position until the track has rotated past said stop, a temperature changing device and means associated with said stop for controlling the operation of said temperature changing device.

5. In combination, a constantly rotating motor means, a friction disc rotated thereby, a timing disc frictionally driven by said friction disc, an arcuate track carried by said timing disc, said track being less than a complete circle, a stop normally in the path of movement of said track whereby said track abuts said stop and said timing disc and track are prevented from rotating, condition responsive means to remove said stop from abutment with said track upon predetermined change in condition value, and means to maintain said stop in released position until said track has completed substantially one full rotation.

6. In combination, a constantly rotating motor means, a friction disc rotated thereby, a timing disc frictionally driven by said friction disc, an arcuate track carried by said timing disc, said track being less than a complete circle, a stop normally in the path of movement of said track whereby said track abuts said stop and said timing disc and track are prevented from rotating, means to move said stop from the path of said track to permit rotation thereof, means to maintain said stop in releasing position until said track has completed substantially one full rotation, and a second stop on said timing disc adapted to abut said first mentioned stop to preclude continuous rotation of said timing disc beyond one full revolution.

7. In combination, a constantly rotating motor means, a friction disc rotated thereby, a timing disc frictionally driven by said friction disc, an arcuate track carried by said timing disc, said track being less than a complete circle, a stop normally in the path of movement of said track whereby said track abuts said stop and said timing disc and track are prevented from rotating, means to move said stop from the path of said track to permit rotation thereof, means to maintain said stop in releasing position until said track has completed substantially one full rotation, a second stop on said timing disc adapted to abut said first mentioned stop to preclude continuous rotation of said timing disc beyond one full revolution, and means to release said first and said second stops from engagement.

8. In combination, a constantly rotating motor means, a friction disc rotated thereby, a timing disc frictionally driven by said friction disc, an arcuate track carried by said timing disc, said track being less than a complete circle, a stop normally in the path of movement of said track whereby said track abuts said stop and said timing disc and track are prevented from rotating, a temperature responsive actuator, electro-magnetic means actuated thereby to move said stop from the path of said track when the temperature to which said actuator responds is at a predetermined value to release said track and said timing disc for rotation, means to maintain said stop in releasing position until said track has rotated past said stop, a second stop adapted to engage said first stop upon complete rotation of said track, and means to release said first and said second stops from engagement upon occurrence of a second predetermined temperature value.

9. In combination, a single circuit thermostatic switch, temperature controlling means, timing means, connections between said thermostatic switch, temperature controlling means and timing means for operating said temperature controlling means for one predetermined minimum period after closure of said thermostatic switch occasioned by a fall in temperature, and means for placing said condition controlling means solely under the control of said main control switch at the end of said period until a predetermined temperature has been attained, causing the opening of said switch, if the switch is still closed at the end of said period.

10. In combination, a single circuit main control switch responsive to a condition which it is desired to control, means for controlling said condition, means responsive to a closure of said main control switch for operating said condition controlling means for a predetermined period independently of the operation of said main control switch during said period, and means for placing the condition controlling means solely under the control of said main control switch at the end of said period until a predetermined condition has been attained, causing the opening of said switch, if the switch is still closed at the end of said period.

GORDON M. PELTZ.